(12) United States Patent
Liu et al.

(10) Patent No.: US 11,500,653 B2
(45) Date of Patent: Nov. 15, 2022

(54) SIGNAL HANDLING BETWEEN PROGRAMS ASSOCIATED WITH DIFFERENT ADDRESSING MODES

(71) Applicant: International Business Machines Corporation, Armonk, NY (US)

(72) Inventors: Ming Ran Liu, Beijing (CN); Bao Zhang, Beijing (CN); Naijie Li, Beijing (CN); Jing Lu, Beijing (CN); Xiao Yan Tang, Beijing (CN); Kershaw S. Mehta, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 16/782,107

(22) Filed: Feb. 5, 2020

(65) Prior Publication Data
US 2021/0240495 A1    Aug. 5, 2021

(51) Int. Cl.
*G06F 9/448*    (2018.01)
*G06F 9/48*    (2006.01)
(Continued)

(52) U.S. Cl.
CPC ........ *G06F 9/4484* (2018.02); *G06F 9/30134* (2013.01); *G06F 9/322* (2013.01); *G06F 9/44505* (2013.01); *G06F 9/485* (2013.01)

(58) Field of Classification Search
None
See application file for complete search history.

(56) References Cited

U.S. PATENT DOCUMENTS

| 5,490,256 A | 2/1996 | Mooney et al. |
| 5,604,885 A | 2/1997 | Denio |

(Continued)

FOREIGN PATENT DOCUMENTS

| CN | 100502599 C | 6/2009 |
| CN | 102752453 A | 10/2012 |

(Continued)

OTHER PUBLICATIONS

Ark et al.; "The Emotion Mouse"; IBM Research Division; 5 Pages.
(Continued)

*Primary Examiner* — Wynuel S Aquino
(74) *Attorney, Agent, or Firm* — Cantor Colburn LLP; Teddi Maranzano (57) ABSTRACT

Techniques for signal handling between programs associated with different addressing modes in a computer system are described herein. An aspect includes, based on a signal occurring during execution of a first program in a first runtime environment, wherein the first program and the first runtime environment are associated with a first addressing mode, invoking a first signal exit routine associated with the first addressing mode. Another aspect includes allocating a signal information area (SIA) by the first signal exit routine. Another aspect includes calling a second signal exit routine associated with a second addressing mode that is different from the first addressing mode with an address of the SIA. Another aspect includes allocating a mirror SIA by the second signal exit routine. Another aspect includes handling the signal, and resuming execution based on the handling of the signal.

8 Claims, 7 Drawing Sheets

(51) Int. Cl.
  *G06F 9/30* (2018.01)
  *G06F 9/32* (2018.01)
  *G06F 9/445* (2018.01)

(56) References Cited

U.S. PATENT DOCUMENTS

| | | | |
|---|---|---|---|
| 5,968,174 A | 10/1999 | Hughes | |
| 6,021,265 A | 2/2000 | Nevill | |
| 6,189,090 B1* | 2/2001 | Tan | G06F 9/30189 |
| | | | 712/E9.035 |
| 8,046,721 B2 | 10/2011 | Chaudhri et al. | |
| 8,235,529 B1 | 8/2012 | Raffle et al. | |
| 8,536,978 B2 | 9/2013 | Coggill | |
| 8,670,755 B2 | 3/2014 | Knezevic | |
| 3,033,875 A1 | 5/2015 | Teller et al. | |
| 2002/0038818 A1 | 4/2002 | Zingher et al. | |
| 2002/0112183 A1 | 8/2002 | Baird et al. | |
| 2004/0015678 A1* | 1/2004 | Strom | G06F 9/3879 |
| | | | 712/E9.023 |
| 2006/0142968 A1 | 6/2006 | Han et al. | |
| 2007/0299322 A1 | 12/2007 | Miyajima et al. | |
| 2007/0300140 A1 | 12/2007 | Makela et al. | |
| 2008/0034217 A1 | 2/2008 | McQuaide | |
| 2009/0284482 A1 | 11/2009 | Chin | |
| 2011/0283241 A1 | 11/2011 | Miller et al. | |
| 2012/0023573 A1 | 1/2012 | Shi | |
| 2012/0126940 A1 | 5/2012 | Coggill et al. | |
| 2013/0099928 A1 | 4/2013 | Daly et al. | |
| 2016/0162293 A1* | 6/2016 | Hooker | G06F 1/3293 |
| | | | 712/216 |
| 2016/0180078 A1 | 6/2016 | Chhabra et al. | |
| 2016/0253458 A1 | 9/2016 | Balwani | |
| 2017/0162032 A1 | 6/2017 | Gellman et al. | |
| 2017/0293499 A1* | 10/2017 | Che | G06F 9/4552 |
| 2019/0104125 A1* | 4/2019 | Dearment | G06F 9/445 |
| 2019/0139050 A1 | 5/2019 | Maheshwari | |
| 2019/0370480 A1 | 12/2019 | Ahmed et al. | |

FOREIGN PATENT DOCUMENTS

| | | |
|---|---|---|
| CN | 206628018 U | 11/2017 |
| FR | 3040521 A1 | 3/2017 |
| KR | 20180067587 A | 6/2018 |
| WO | 2012092102 A1 | 7/2012 |
| WO | 2015139917 A1 | 9/2015 |

OTHER PUBLICATIONS

Bell et al., "Access Level Based On Stress Determination," U.S. Appl. No. 16/218,932, filed Dec. 13, 2018.

Healey et al.; "Detecting Stress During Real-World Driving Tasks Using Physiological Sensors"; Cambridge Research Laboratory; Dec. 17, 2004; 22 Pages.

IBM "List of IBM Patents or Patent Applications Treated as Related; (Appendix P)", Filed Feb. 5, 2020, 2 pages.

Sierra et al.; "Real-Time Stress Detection by Means of Physiological Signals"; Recent Applications in Biometrics: 2011; 23 Pages.

* cited by examiner

SIGNAL HANDLING BETWEEN PROGRAMS ASSOCIATED WITH DIFFERENT ADDRESSING MODES

BACKGROUND

The present invention relates generally to the interaction between programs associated with different addressing modes, and more particularly, to signal handling between programs associated with different addressing modes in a computer system.

A 32-bit processor architecture design—a once common processor architecture—is becoming increasingly replaced by a 64-bit processor architecture. An n-bit processor (e.g., a central processing unit (CPU)) includes various registers, each of which is capable of referencing $2^n$ memory addresses that are, in turn, used to access corresponding data stored in random access memory (RAM). For instance, each register in a 32-bit processor is capable of referencing $2^{32}$ memory addresses, which corresponds to 4 gigabytes of RAM because each bit in the register can reference an individual byte in memory. In contrast, each register in a 64-bit processor is capable of theoretically referencing $2^{64}$ memory addresses corresponding to 16 exabytes of RAM— several orders of magnitude greater than a 32-bit register.

Generally speaking, a particular operating system (O/S) is configured to run on a particular n-bit processor. For instance, a 32-bit O/S is configured to run on a 32-bit processor while a 64-bit O/S is configured to run on a 64-bit processor. A lower bit O/S can run on a higher bit processor, but not the other way around. For example, a 32-bit O/S can run on a 64-bit processor, but a 64-bit O/S cannot run on a 32-bit processor. Similarly, computer programs, applications, or the like are typically written for a particular n-bit O/S (e.g., a 64-bit program for a 64-bit O/S). Further, while a lower bit program can be handled by a higher bit O/S (e.g., a 32-bit program running on a 64-bit O/S), the converse is generally not true. That is, a lower bit O/S generally cannot handle execution of a higher bit program. For instance, a 64-bit application cannot run on a 32-bit processor (or be handled by a 32-bit O/S) because the 64-bit instructions of the 64-bit application will not be recognized by a 32-bit processor.

SUMMARY

Embodiments of the present invention are directed to signal handling between programs associated with different addressing modes in a computer system. A non-limiting example computer-implemented method includes, based on a signal occurring during execution of a first program in a first runtime environment, wherein the first program and the first runtime environment are associated with a first addressing mode, invoking a first signal exit routine associated with the first addressing mode. The method also includes allocating a signal information area (SIA) by the first signal exit routine. The method also includes calling a second signal exit routine associated with a second addressing mode that is different from the first addressing mode with an address of the SIA. The method also includes allocating a mirror SIA by the second signal exit routine. The method also includes handling the signal, and resuming execution based on the handling of the signal.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide signal handling between programs associated with different addressing modes. A signal may occur at any time during execution of programs associated with different addressing modes, and may include an interrupt corresponding to a hardware or software task that requires immediate attention by the processor of the computer system. The different addressing modes may be referred to herein generically as addressing mode M (Amode M) and addressing mode N (Amode N), where M and N are different values. For instance, in example embodiments, a program associated with addressing mode Amode M may be a 31-bit or 32-bit program and a program associated with addressing mode Amode N may be a 64-bit program, or vice versa. While example embodiments may be described with respect to interoperability between 32-bit and 64-bit programs, it should be appreciated that the programs may be any N-bit and M-bit programs as long as N and M represent different values (i.e., different addressing modes). In addition, the term program as used herein encompasses any software application, program module, or more generally, computer-executable code configured to execute on a computer processor. Further, interoperability between programs associated with different addressing modes may include the capability to handle cross-Amode function calls (i.e., calls between a caller and a callee associated with different addressing modes) including, without limitation, dynamic linkage function calls (e.g., where the caller and the callee are in different executables); static linkage function calls (e.g., where the caller and the callee are in the same executable); dynamic calls; and so forth.

Recent years have seen the emergence of an increasing number of 64-bit programs, which provide better scalability and much larger memory addressability than 32-bit programs, for example. Further, more 64-bit programs are being written to leverage certain innovations only available with the 64-bit addressing mode. There remain, however, many 32-bit programs that continue to play a vital role in critical workloads. Thus, interaction between 32-bit programs and 64-bit programs is necessary to modernize the business logic of workloads, while at the same time, maintaining the viability of legacy 32-bit programs.

There are various differences between different addressing modes that make interoperability between programs written in the different addressing modes difficult including, without limitation, different memory addressability capabilities (e.g., 4 gigabyte for a 32-bit addressing mode and 16 exabytes for a 64-bit addressing mode) and different linkage conventions that define how stack frames are managed and how parameters are passed. With respect to linkage convention differences, in a 64-bit program, for example, save areas and registers are twice as large as in a 32-bit program such that calling conventions for a 64-bit program take advantage of the additional register space to pass more arguments in registers. Further, 32-bit programs utilize a standard linkage convention (upward stack) while 64-bit programs utilize a different linkage convention (downward stack).

There are various existing approaches for supporting 32-bit and 64-bit interactions, each of which suffers from various technical drawbacks. For example, inter-process communication has been used but the overhead that it introduces contributes to poor performance. Moreover, redesign of the original application is required including additional development and testing which requires significant effort and can result in significant delay. In addition, each programming language has its own inter-process communication semantics which can result in issues for calls between different languages. Another existing approach for supporting 32-bit and 64-bit interactions is a remote call based on, for example, a RESTful Application Programming Interface (API). However, the performance associated with remote calls is even worse than with inter-process communication. Yet another existing approach is to recompile an application. For example, a 32-bit application can be recompiled as a 64-bit application. This approach, however, is an all-or-none approach that requires recompilation of all programs in an application, which can be a disruptive migration particularly for large enterprises. In addition, some languages still have no 64-bit support (e.g., Enterprise COBOL).

Example embodiments of the invention provide signal handling methodology for programs associated with different addressing modes that is based on creating and utilizing a pre-initialized secondary runtime environment to enable function calls across the different addressing modes. This signal handling technique in accordance with example embodiments of the invention represents a technical solution that addresses the aforementioned technical problems associated with existing approaches for supporting interaction across addressing modes. In particular, a signal handling technique in accordance with example embodiments of the invention does not require any changes to be made to programs written in their respective addressing modes and is language-independent meaning that interoperability is supported between any languages and any addressing modes. In addition, the pre-initialized secondary runtime environment that is generated and utilized in accordance with example embodiments is persistent, and thus, can support multiple interoperability calls, which in turn, improves performance. Still further, a signal handling technique in accordance with example embodiments can be used in connection with any existing compiler; a Java Native Interface (JNI); or any other system/runtime/software to support the interoperability of programs associated with different addressing modes. In addition, in accordance with example embodiments, the respective executions of different addressing mode programs are separated which allows for easier debugging. Each of these technical improvements associated with a signal handling technique in accordance with example embodiments constitutes technical effects of the invention that together represent an improvement in computer technology and the functioning of a computer. In particular, these technical improvements improve the functioning of a computer by allowing for improved cross-addressing mode signal handling between programs associated with different addressing modes.

Embodiments of the invention include a signal information area (SIA) and mirror SIA, which may be used for sharing signal information between Amode M and Amode N runtime environments. The SIA and mirror SIA are each allocated a respective block of storage, and are anchored at the thread level. Information in an SIA may include, but is not limited to, an anchor area, which gives an address of a mirror SIA in the other environment; a stack frame cursor, which points to the current stack frame in the current runtime environment; and signal information, which contains signal and context information that are saved when a signal occurs. The SIA and mirror SIA may be anchored in the thread level control block of the respective runtime environment, and may be released when the signal is handled.

In some embodiments, when a signal occurs during dual-mode execution, a signal exit routine in the current runtime environment creates an SIA, records the current stack position in the SIA, and call a signal exit routine in the other Amode (e.g., via runOnM( ) or runOnN( ), according to the Amode of the interrupted program) based on traversing the frames in the stack in the current runtime environment until a transition routine stack frame is located. When the signal exit routine in the paired runtime environment takes control, a mirror SIA may be created, and the stack frames are traversed in the paired runtime environment. If a transition routine stack frame is encountered, the signal exit routine may update the stack frame cursor in the mirror SIA and return to the signal exit routine in the runtime environment where the signal occurred. When the signal is handled, the dual-mode execution may be resumed. If there is no transition routine between the stack frame where the signal occurs and the resume point, the stack frames between stack top to the resume point may be collapsed. If there are one or more transition routines between the stack frame where the signal occurs and the resume point, the stack frames between the stack top to the resume point may be collapsed in the runtime environment in which the resume point is located. The stack frames between the stack top and the stack frame cursor may also be collapsed in the paired runtime environment.

Illustrative methods in accordance with example embodiments of the invention will now be described. It should be noted that each operation of any of the methods 400-600 may be performed by one or more of the program modules or the like depicted in FIG. 7, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 1:
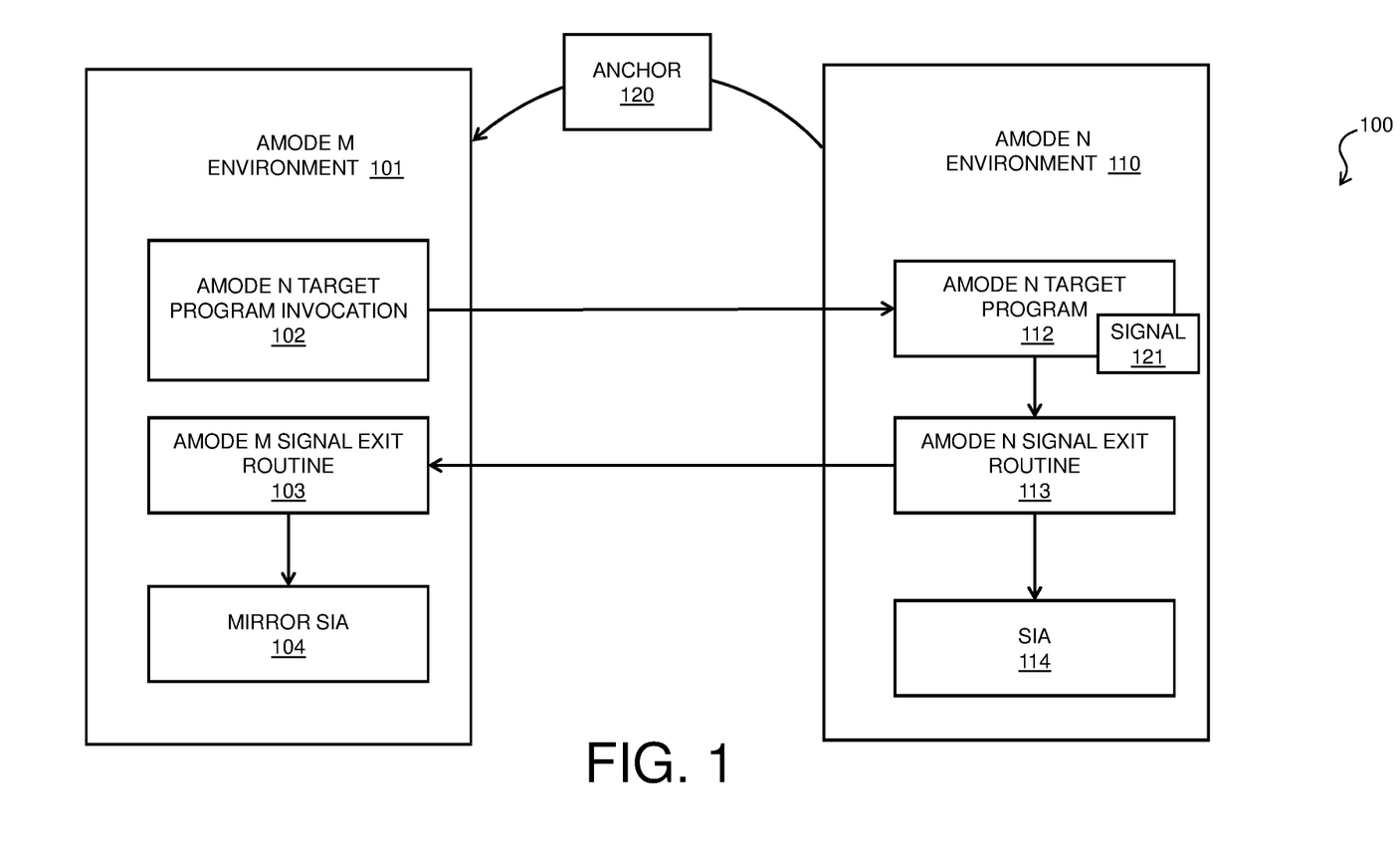
FIG. 1 is a schematic diagram illustrating signal handling for non-nested calls between programs associated with different addressing modes in a single-threaded runtime environment in accordance with one or more example embodiments.
Figure 4:
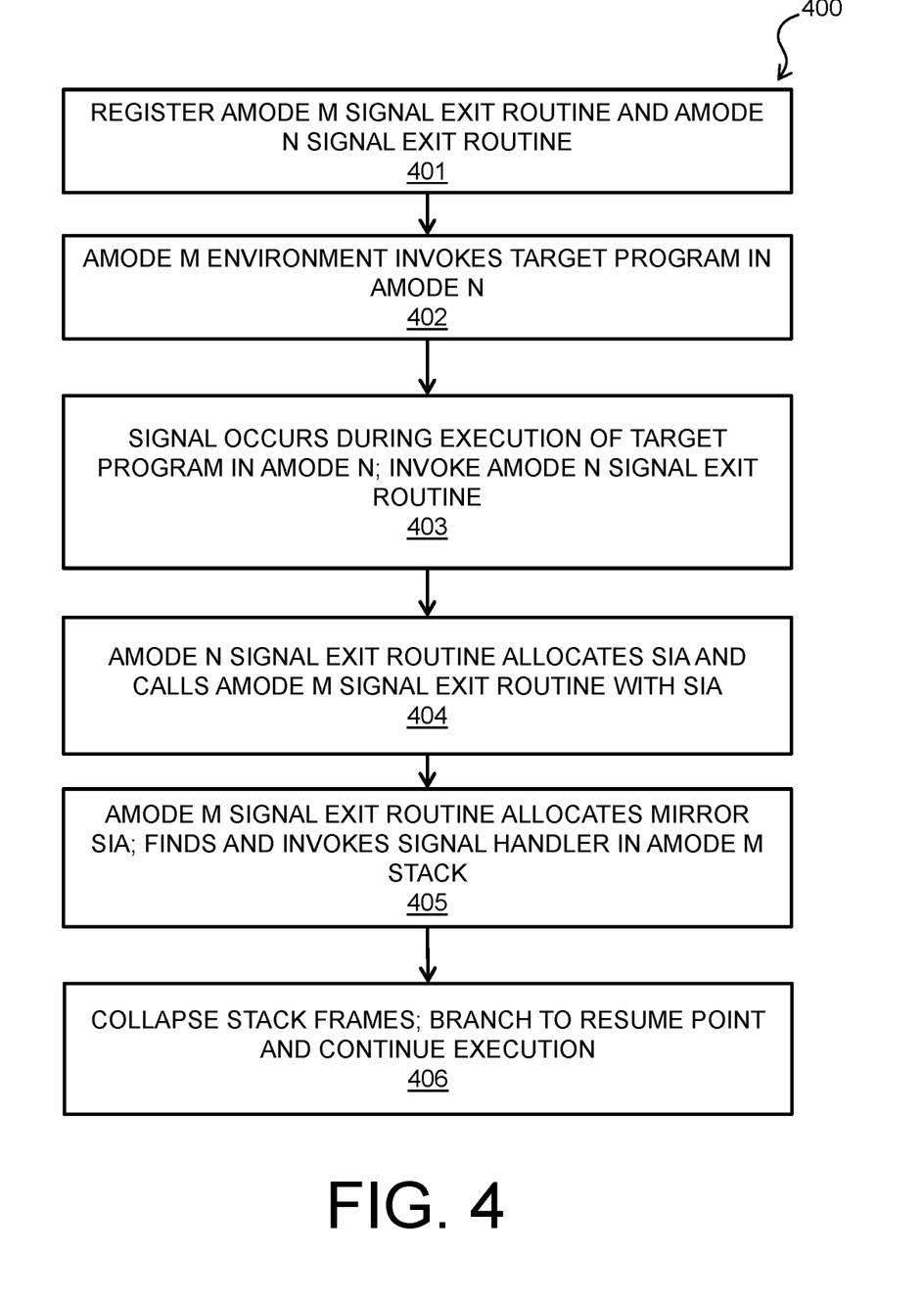
FIG. 4 is a process flow diagram of an illustrative method for signal handling for non-nested calls between programs associated with different addressing modes in a single-threaded runtime environment in accordance with one or more example embodiments.

FIG. 1 is a schematic diagram illustrating a system 100 for signal handling for non-nested calls between programs associated with different addressing modes in a single-threaded runtime environment and FIG. 4 is a process flow diagram of an illustrative method 400 for implementing the use case of FIG. 1. FIGS. 1 and 4 will be described in conjunction with one another hereinafter. In embodiments corresponding to FIG. 1 and FIG. 4, execution is single-threaded, Amode M calls Amode N with no further crossing of Amode calls in the secondary runtime, and normal termination occurs in the secondary runtime. System 100 of FIG. 1 includes pre-initialized secondary runtime environment (Amode N environment 110) that is anchored 120 to a parent runtime environment (Amode M environment 101). In block 401 of method 400 of FIG. 4, during initialization of Amode M environment 101, an Amode M signal exit routine 103 is registered with the operating system of the computer system. An Amode N signal exit routine 113 is also registered with the operating system by initialization of the Amode N environment 110. In block 402 of method 400, a program that is executing in the Amode M environment 101 invokes Amode N target program 112 in Amode N environment 110 via Amode N target program invocation 102 (e.g., runOnN( )), and execution passes from Amode M environment 101 to Amode N target program 112 in the Amode N environment 110.

In block 403 of method 400, a signal 121 occurs during execution of Amode N target program 112, which causes the operating system to invoke Amode N signal exit routine 113 based on the Amode of the interrupted program (i.e., Amode N target program 112). The signal 121 may include an interrupt corresponding to a task that requires immediate attention by a processor in the computer system. In block 404, the Amode N signal exit routine 113 allocates SIA 114. Information in SIA 114 may include, but is not limited to, an anchor area, which gives an address of a mirror SIA in the other environment; a stack frame cursor, which points to the current stack frame in the current runtime environment; and signal information, which contains signal and context information that are saved when the signal 121 occurred. The Amode N signal exit routine 113 traverses the stack frames in the stack of the Amode N environment 110 until a transition routine stack frame is reached, and updates a stack frame cursor in the SIA 114 to point to the stack frame prior to the transition routine stack frame. The Amode N signal exit routine 113 then calls the Amode M signal exit routine 103 via runOnM( ) with the address of SIA 114.

In block 405 of method 400, the Amode M signal exit routine 103 allocates mirror SIA 104. The Amode M signal exit routine 103 traverses the stack frames in the stack of the Amode M environment 101 until a signal handler is reached, and invokes the signal handler to handle signal 121. In block 406 of method 400, based on the signal 121 being handled, if the resume point is in the Amode M stack in Amode M environment 101, the Amode M signal exit routine 103 collapses the stack frames in the Amode M stack from the top of the stack to the resume point in block 406, and updates the Amode N stack top information in the Amode N thread runtime state according to the stack frame cursor in SIA 114. If the resume point is in the Amode N stack in the Amode N environment 110, the Amode N signal exit routine 113 collapses the stack frames between the top of the Amode N stack and the resume point in block 406. SIA 114 and mirror SIA 104 may be released in block 406. Execution resumes by branching to the resume point, and continues in the Amode environment where the resume point was located.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Further, the process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 2:
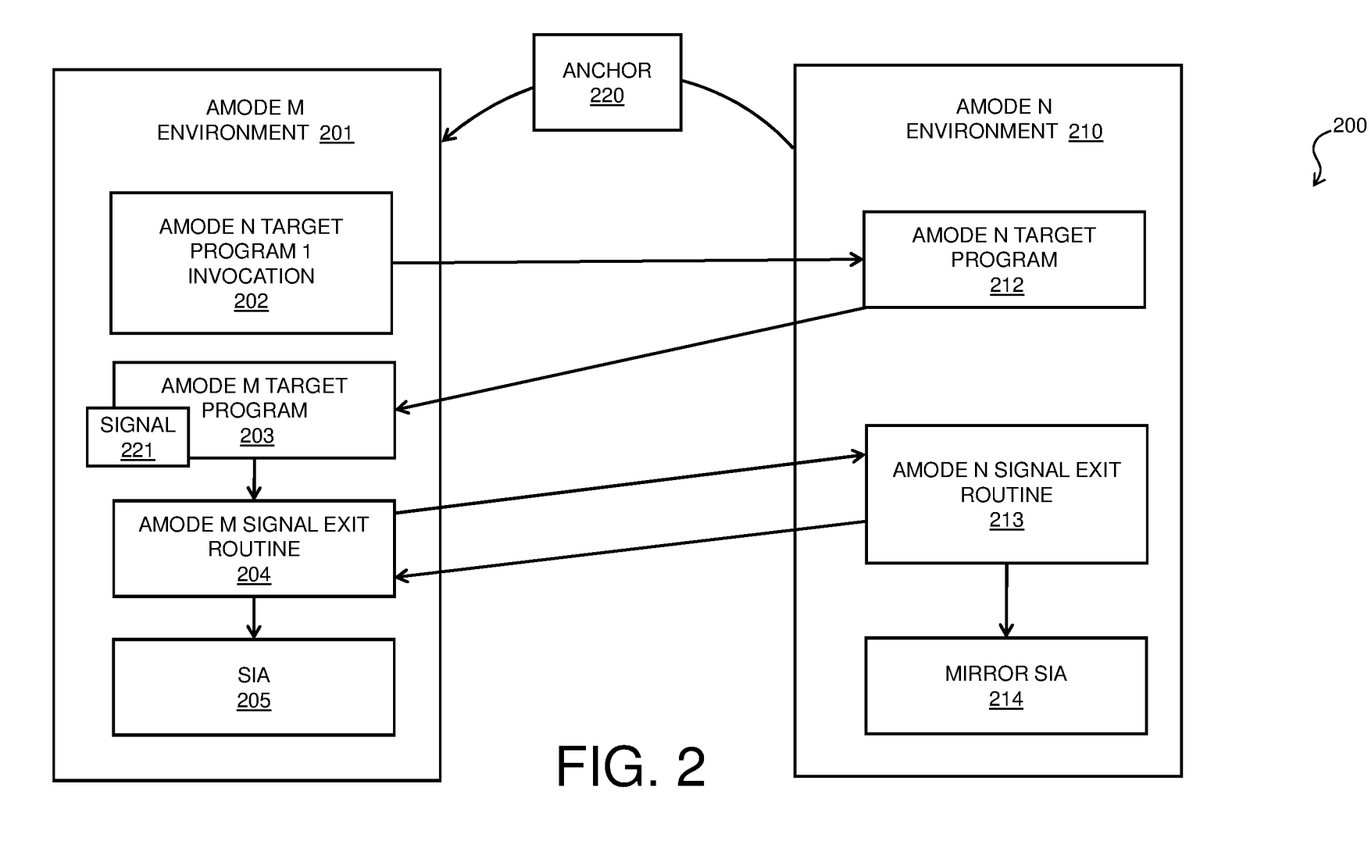
FIG. 2 is a schematic diagram illustrating signal handling for nested calls between programs associated with different addressing modes in a single-threaded runtime environment in accordance with one or more example embodiments.
Figure 5:
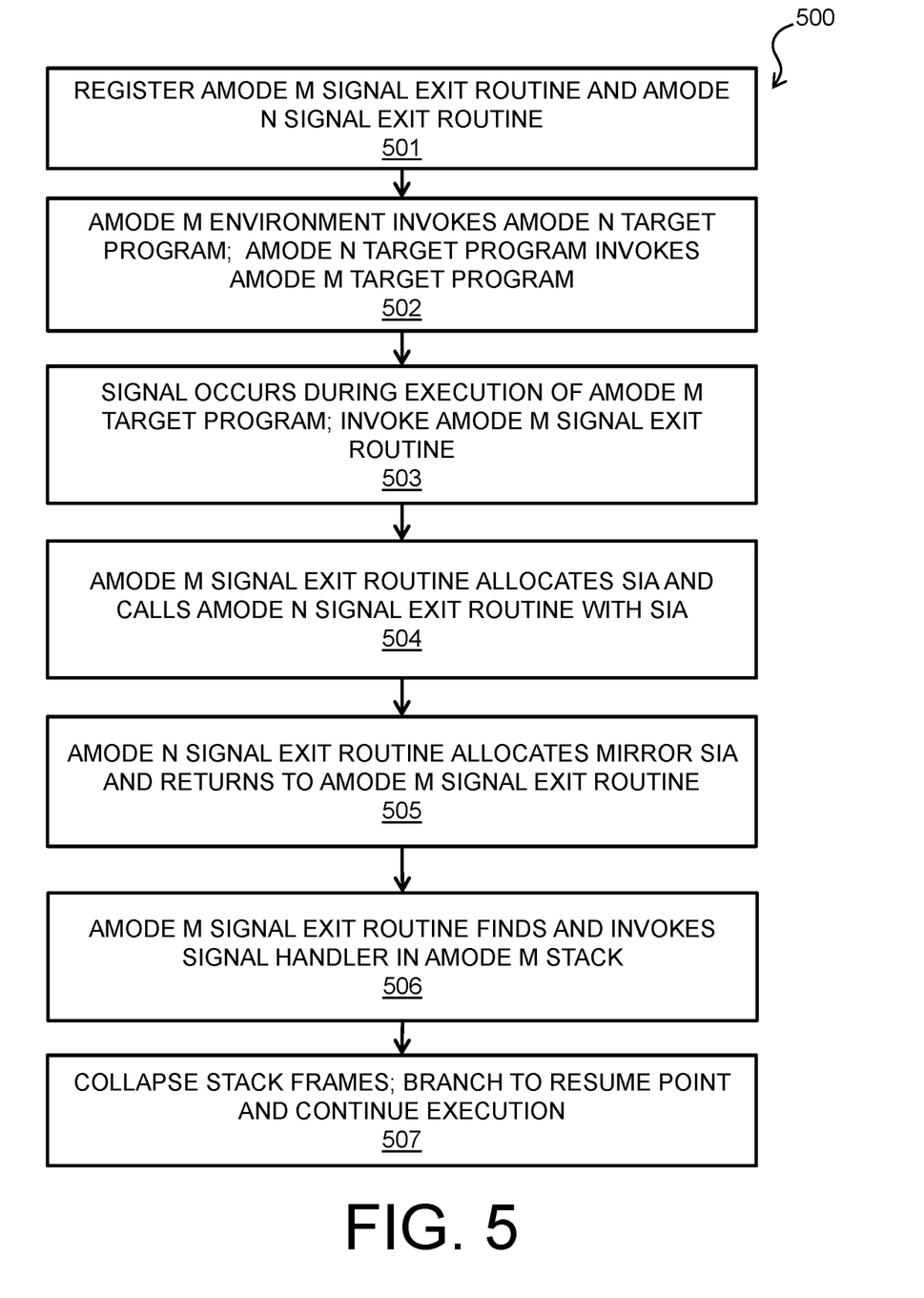
FIG. 5 is a process flow diagram of an illustrative method for signal handling for nested calls between programs associated with different addressing modes in a single-threaded runtime environment in accordance with one or more example embodiments.

FIG. 2 is a schematic diagram illustrating a system 200 for signal handling for nested calls between programs associated with different addressing modes in a single-threaded runtime environment and FIG. 5 is a process flow diagram of an illustrative method 500 for implementing the use case of FIG. 2. FIGS. 2 and 5 will be described in conjunction with one another hereinafter. In embodiments corresponding to FIG. 2 and FIG. 5, execution is single-threaded, and there are nested calls between Amode M and Amode N. System 200 of FIG. 2 includes pre-initialized secondary runtime environment (Amode N environment 210) that is anchored 220 to a parent runtime environment (Amode M environment 201). In block 501 of method 500 of FIG. 5, during initialization of Amode M environment 201, an Amode M signal exit routine 204 is registered with the operating system of the computer system. An Amode N signal exit routine 213 is also registered with the operating system by initialization of the Amode N environment 210. In block 502 of method 500, a program that is executing in the Amode M environment 201 invokes Amode N target program 212 in Amode N environment 210 via Amode N target program invocation 202 (e.g., runOnN( ), and execution passes from Amode M environment 201 to Amode N target program 212 in the Amode N environment 210. During execution of Amode N target program 212 in Amode N environment 210, Amode N target program 212 calls Amode M target program 203 in Amode M environment 201 via runOnM( ), and execution passes back to Amode M environment 201 from Amode N environment 210.

In block 503 of method 500, a signal 221 occurs during execution of Amode M target program 203. The signal 221 may include an interrupt corresponding to a task that requires immediate attention by a processor in the computer system. The occurrence of the signal 221 causes the operating system to invoke Amode M signal exit routine 204 based on the Amode of the interrupted program (i.e., Amode M target program 203). In block 504, the Amode M signal exit routine 204 allocates SIA 205. Information in SIA 205 may include, but is not limited to, an anchor area, which gives an address of a mirror SIA in the other environment; a stack frame cursor, which points to the current stack frame in the current runtime environment; and signal information, which contains signal and context information that are saved when the signal 221 occurred. Amode M signal exit routine 204 traverses the stack frames in the stack of the Amode M environment 201 until a transition routine stack frame is reached. The Amode M signal exit routine 204 then updates a stack frame cursor in the SIA 205 to point to the stack frame prior to the transition routine stack frame in the Amode M stack. The Amode M signal exit routine 204 then calls the Amode N signal exit routine 213 via runOnN( ) with the address of SIA 205.

In block 505 of method 500, the Amode N signal exit routine 213 allocates a mirror SIA 214, and traverses the stack frames in the stack of the Amode N environment 210 until a transition routine stack frame is reached. The Amode N signal exit routine 213 then updates a stack frame cursor in the mirror SIA 214 to point to the stack frame prior to the transition routine stack frame in the Amode N stack. The Amode N signal exit routine 213 then returns to the Amode M signal exit routine 204 via runOnN( ) returning.

In block 506 of method 500, the Amode M signal exit routine 204 traverses the stack frames in the Amode M environment until a signal handler is reached, and invokes the signal handler to handle the signal 221. In block 507, based on the signal 221 being handled, if the resume point is in the Amode M stack, the Amode M signal exit routine 204 collapses the stack frames in the Amode M stack in the Amode M environment 201 between the stack top and the resume point, and updates the top stack position in the Amode N thread runtime state according to the stack frame cursor in mirror SIA 214. If the resume point is in the Amode N stack, the Amode N signal exit routine 213 collapses the stack frames in the Amode N stack in the Amode N environment 210 between the stack top and the resume point in block 507, and updates the top stack position in the Amode M thread runtime state according to the stack frame cursor in SIA 205. SIA 205 and mirror SIA 214 may be released in block 507. Execution resumes by branching to the resume point based on the thread runtime state, and continues in the Amode environment where the resume point was located.

In some embodiments according to system 200 of FIG. 2 and method 500 of FIG. 5, any appropriate number of nested calls may be made between programs in Amode M environment 201 and Amode N environment 210. Each nested call may correspond to a respective transition routine stack frame in the stack of the callee environment. In such embodiments, the Amode M signal exit routine 204 and Amode N signal exit routine 213 may pass control between each other based on reaching transition routine stack frames during stack traverse until a signal handler is found in the Amode M stack. Each time a transition routine stack frame is encountered, a stack frame cursor in SIA 205 or mirror SIA 214 maybe updated to point to a stack frame prior to the encountered transition routine stack frame.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Further, the process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 3:
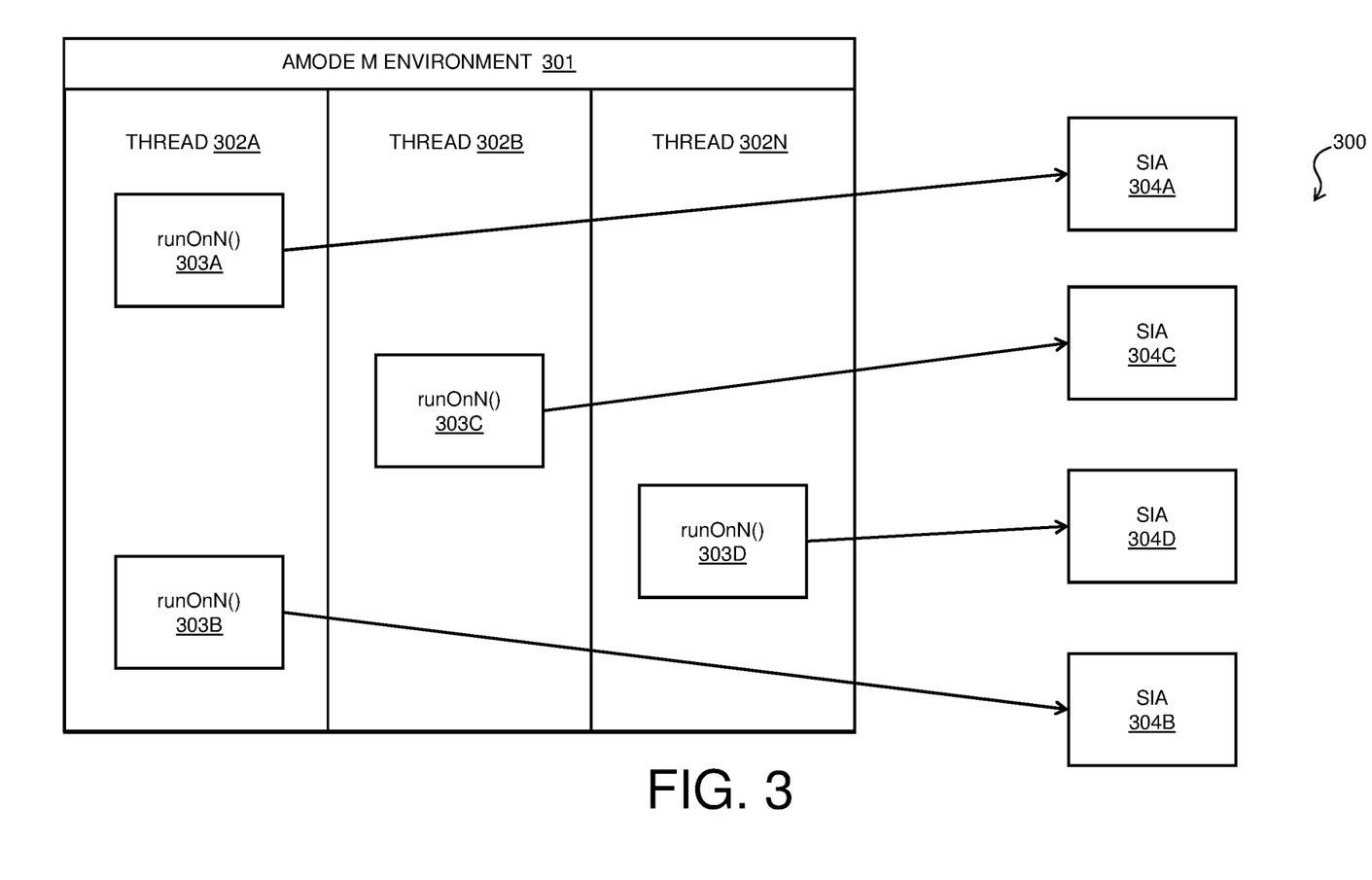
FIG. 3 is a schematic diagram illustrating signal handling for programs associated with different addressing modes in a multi-threaded runtime environment in accordance with one or more example embodiments.
Figure 6:
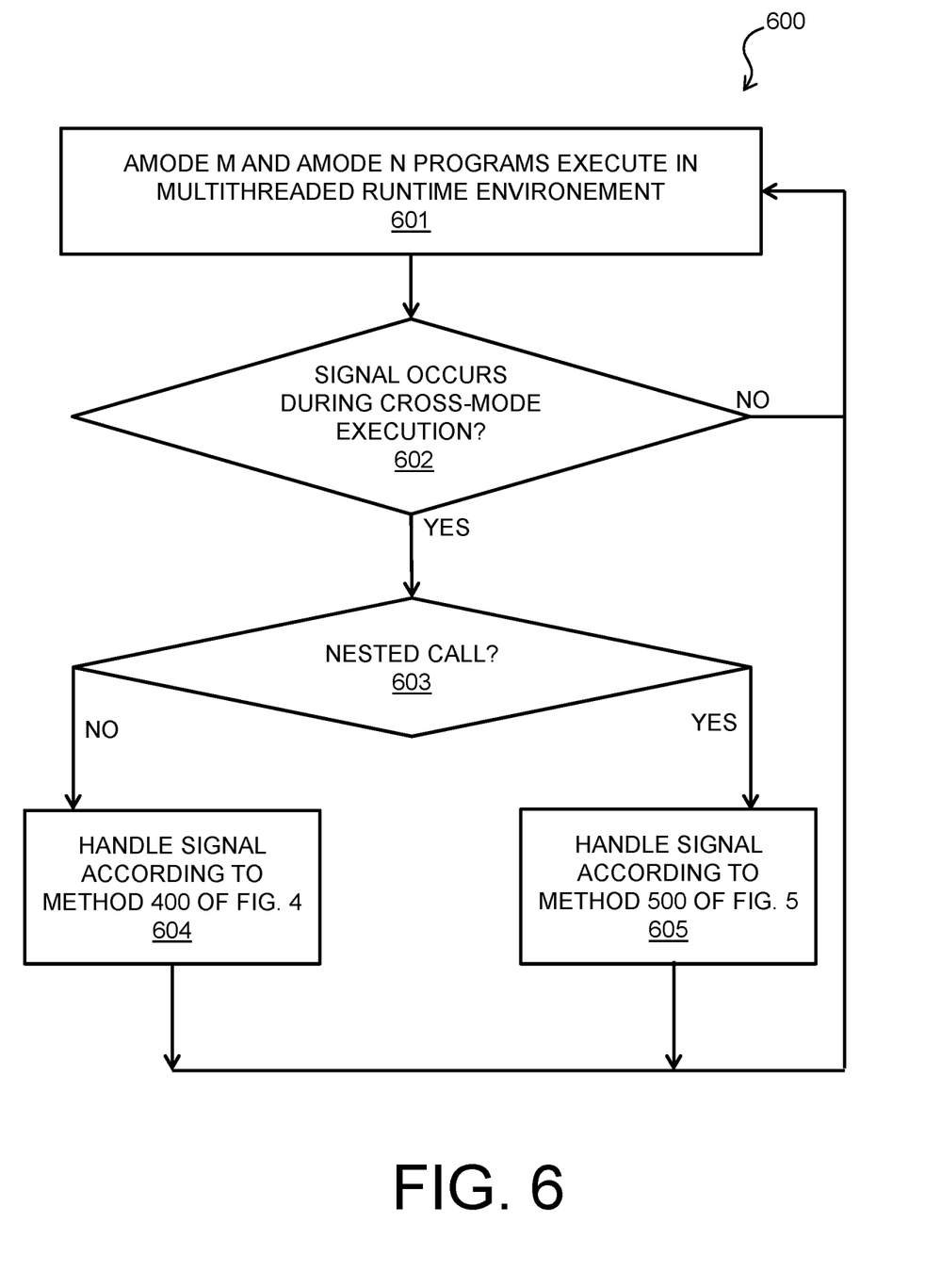
FIG. 6 is a process flow diagram of an illustrative method for signal handling for programs associated with different addressing modes in a multi-threaded runtime environment in accordance with one or more example embodiments.

FIG. 3 is a schematic diagram illustrating a system 300 for signal handling for programs associated with different addressing modes in a multi-threaded runtime environment and FIG. 6 is a process flow diagram of an illustrative method 600 for implementing the use case of FIG. 3. FIGS. 3 and 6 will be described in conjunction with one another hereinafter. In embodiments corresponding to FIG. 3 and FIG. 6, execution in an Amode M environment is multi-threaded, and any thread in the parent Amode M environment may call one or more target programs in a corresponding secondary Amode N environment during execution. In block 601 of method 600, a plurality of threads 302A-N are executing in an Amode M environment 301. Amode calls 303A-D are made to one or more target programs in a paired Amode N environment via runOnN( ) during execution of threads 302A-N in Amode M environment 301 during block 601. The Amode calls 303A-D may each be either nested or non-nested. In block 602, a signal occurs during cross-mode execution of a thread of threads 302A-N. For example, a signal may occur in thread 302A corresponding to Amode call 303A. In block 603, it is determined whether the Amode call corresponding to the signal that was detected in block 602 (e.g., Amode call 303A) is a nested call. If it is determined in block 603 that the Amode call 303A is not a nested call in block 603, flow proceeds from block 603 to block 604, and the signal is handled using SIA 304A according to method 400 of FIG. 4, as described above. Other threads (e.g., threads 302B-N) may not be affected by the signal handling in thread 302A during block 604. Flow then proceeds from block 604 back to block 601, and execution of threads 302A-N in Amode M environment 301 continues.

If it is determined in block 603 that the Amode call 303A is a nested call in block 603, flow proceeds from block 603 to block 605, and the signal is handled using SIA 304A according to method 500 of FIG. 5, as described above. Other threads (e.g., threads 302B-N) may not be affected by the signal handling in thread 302A during block 605. Flow then proceeds from block 605 back to block 601, and execution of threads 302A-N in Amode M environment 301 continues. Method 600 may be repeated throughout operation of system 300 of FIG. 3. As shown in FIG. 3, each Amode call 303A-D may allocate a respective SIA 304A-D, such that signals may be handled separately as they occur in each thread of threads 302A-N according to method 600.

It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., additional memory components, embedded controllers, functional blocks, connections between functional blocks, modules, inputs, outputs, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Further, the process flow diagram of FIG. 6 is not intended to indicate that the operations of the method 600 are to be executed in any particular order, or that all of the operations of the method 600 are to be included in every case. Additionally, the method 600 can include any suitable number of additional operations.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 7:
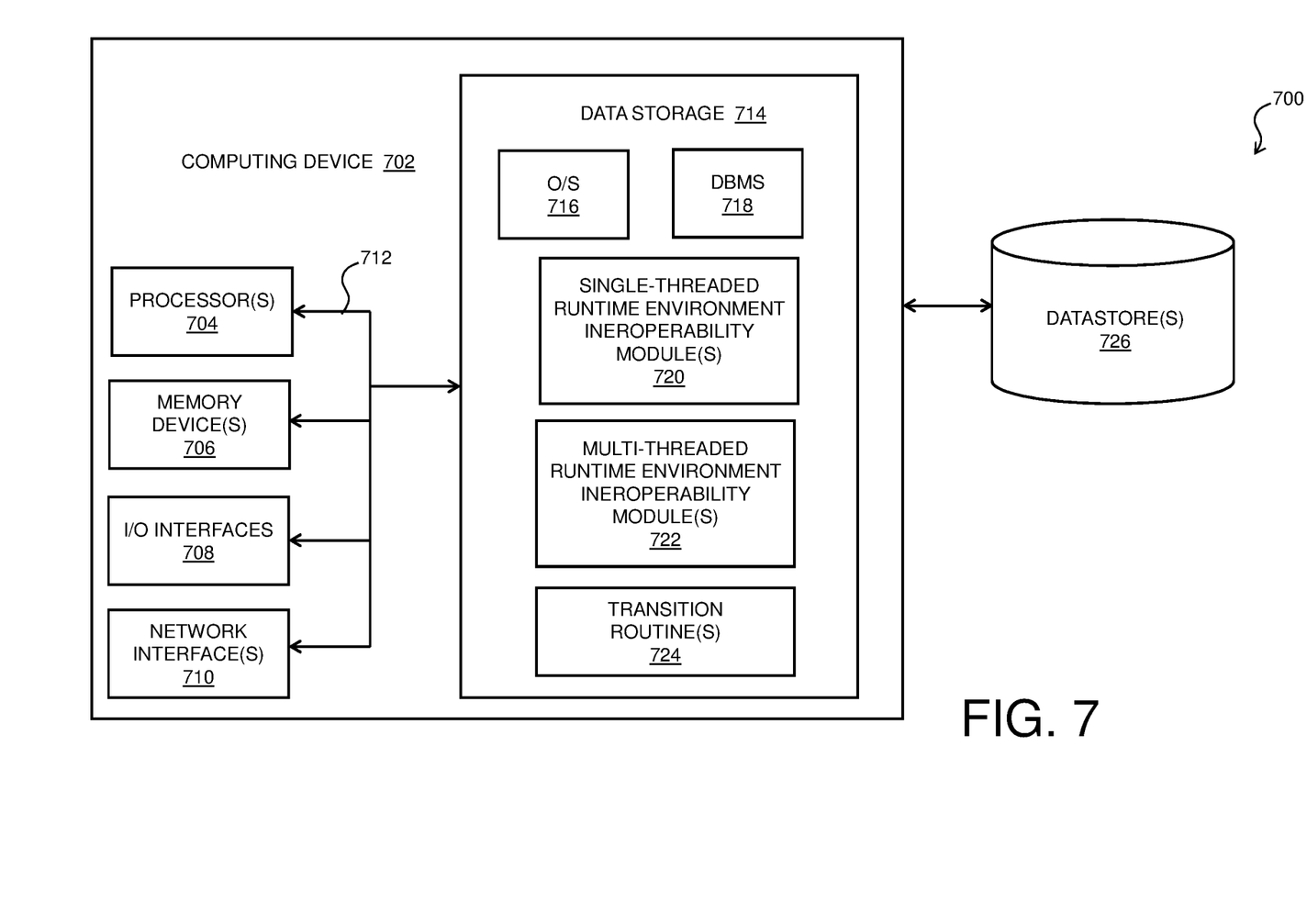
FIG. 7 is a schematic diagram of an illustrative computing device configured to implement one or more example embodiments of signal handling between programs associated with different addressing modes.

FIG. 7 is a schematic diagram of an illustrative computing device 702 configured to implement one or more example embodiments of the disclosure. The computing device 702 may be any suitable device including, without limitation, a server, a personal computer (PC), a tablet, a smartphone, a wearable device, a voice-enabled device, or the like. While any particular component of the computing device 702 may be described herein in the singular, it should be appreciated that multiple instances of any such component may be provided, and functionality described in connection with a particular component may be distributed across multiple ones of such a component.

Although not depicted in FIG. 7, the computing device 702 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 may include one or more processors (processor(s)) 704; one or more memory devices 706 (generically referred to herein as memory 706); one or more input/output ("I/O") interface(s) 708; one or more network interfaces 710; and data storage 714. The computing device 702 may further include one or more buses 712 that functionally couple various components of the computing device 702.

The bus(es) 712 may include at least one of a system bus, a memory bus, an address bus, or a message bus, and may permit the exchange of information (e.g., data (including computer-executable code), signaling, etc.) between various components of the computing device 702. The bus(es) 712 may include, without limitation, a memory bus or a memory controller, a peripheral bus, an accelerated graphics port, and so forth. The bus(es) 712 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 706 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 706 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 706 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 714 may include removable storage and/or non-removable storage including, but not limited to, magnetic storage, optical disk storage, and/or tape storage. The data storage 714 may provide non-volatile storage of computer-executable instructions and other data. The memory 706 and the data storage 714, removable and/or non-removable, are examples of computer-readable storage media (CRSM) as that term is used herein.

The data storage 714 may store computer-executable code, instructions, or the like that may be loadable into the memory 706 and executable by the processor(s) 704 to cause the processor(s) 704 to perform or initiate various operations. The data storage 714 may additionally store data that may be copied to memory 706 for use by the processor(s) 704 during the execution of the computer-executable instructions. Moreover, output data generated as a result of execution of the computer-executable instructions by the processor(s) 704 may be stored initially in memory 706 and may ultimately be copied to data storage 714 for non-volatile storage.

More specifically, the data storage 714 may store one or more operating systems (O/S) 716; one or more database management systems (DBMS) 718 configured to access the memory 706 and/or one or more external datastores 726; and one or more program modules, applications, engines, managers, computer-executable code, scripts, or the like such as, for example, one or more single-threaded runtime environment interoperability modules 720; one or more multi-threaded runtime environment interoperability modules 722; and transition routines 724. Any of the components depicted as being stored in data storage 714 may include any combination of software, firmware, and/or hardware. The software and/or firmware may include computer-executable instructions (e.g., computer-executable program code) that may be loaded into the memory 706 for execution by one or more of the processor(s) 704 to perform corresponding operations described earlier. In particular, the single-threaded runtime environment interoperability module(s) 720 may be executed to perform operations of method 400 and/or method 500. The multi-threaded runtime environment interoperability module(s) 722 may be executed to perform operations of method 600. Further, the transition routines 724 may include the transition routines previously described.

Although not depicted in FIG. 7, the data storage 714 may further store various types of data utilized by components of the computing device 702 (e.g., data stored in the datastore(s) 726). Any data stored in the data storage 714 may be loaded into the memory 706 for use by the processor(s) 704 in executing computer-executable instructions. In addition, any data stored in the data storage 714 may potentially be stored in the external datastore(s) 726 and may be accessed via the DBMS 718 and loaded in the memory 706 for use by the processor(s) 704 in executing computer-executable instructions.

The processor(s) 704 may be configured to access the memory 706 and execute computer-executable instructions loaded therein. For example, the processor(s) 704 may be configured to execute computer-executable instructions of the various program modules, applications, engines, managers, or the like of the computing device 702 to cause or facilitate various operations to be performed in accordance with one or more example embodiments of the disclosure. The processor(s) 704 may include any suitable processing unit capable of accepting data as input, processing the input data in accordance with stored computer-executable instructions, and generating output data. The processor(s) 704 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 704 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 704 may be capable of supporting any of a variety of instruction sets.

Referring now to other illustrative components depicted as being stored in the data storage 714, the O/S 716 may be loaded from the data storage 714 into the memory 706 and may provide an interface between other application software executing on the computing device 702 and hardware resources of the computing device 702. More specifically, the O/S 716 may include a set of computer-executable instructions for managing hardware resources of the computing device 702 and for providing common services to other application programs. In certain example embodiments, the O/S 716 may include or otherwise control the execution of one or more of the program modules, engines, managers, or the like depicted as being stored in the data storage 714. The O/S 716 may include any operating system now known or which may be developed in the future including, but not limited to, any server operating system, any mainframe operating system, or any other proprietary or non-proprietary operating system.

The DBMS 718 may be loaded into the memory 706 and may support functionality for accessing, retrieving, storing, and/or manipulating data stored in the memory 706, data stored in the data storage 714, and/or data stored in external datastore(s) 726. The DBMS 718 may use any of a variety of database models (e.g., relational model, object model, etc.) and may support any of a variety of query languages. The DBMS 718 may access data represented in one or more data schemas and stored in any suitable data repository. Data stored in the datastore(s) 726 may include, for example, function call parameters; linkage conventions; stack parameters; etc. External datastore(s) 726 that may be accessible by the computing device 702 via the DBMS 718 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 708 may facilitate the receipt of input information by the computing device 702 from one or more I/O devices as well as the output of information from the computing device 702 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 702 or may be separate. The I/O devices may further include, for example, any number of peripheral devices such as data storage devices, printing devices, and so forth.

The I/O interface(s) 708 may also include an interface for an external peripheral device connection such as universal serial bus (USB), FireWire, Thunderbolt, Ethernet port or other connection protocol that may connect to one or more networks. The I/O interface(s) 708 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 may further include one or more network interfaces 710 via which the computing device 702 may communicate with any of a variety of other systems, platforms, networks, devices, and so forth. The network interface(s) 710 may enable communication, for example, with one or more other devices via one or more of networks.

It should be appreciated that the program modules/engines depicted in FIG. 7 as being stored in the data storage 714 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 702 and/or other computing devices accessible via one or more networks, may be provided to support functionality provided by the modules depicted in FIG. 7 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 7 may be implemented, at least partially, in hardware and/or firmware across any number of devices.

It should further be appreciated that the computing device 702 may include alternate and/or additional hardware, software, or firmware components beyond those described or depicted without departing from the scope of the disclosure. More particularly, it should be appreciated that software, firmware, or hardware components depicted as forming part of the computing device 702 are merely illustrative and that some components may not be present or additional components may be provided in various embodiments. While various illustrative modules have been depicted and described as software modules stored in data storage 714, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 400-600 may be performed by a computing device 702 having the illustrative configuration depicted in FIG. 7, or more specifically, by one or more program modules, engines, applications, or the like executable on such a device. It should be appreciated, however, that such operations may be implemented in connection with numerous other device configurations.

The operations described and depicted in the illustrative methods of FIG. 4-6 may be carried out or performed in any suitable order as desired in various exemplary embodiments of the disclosure. Additionally, in certain example embodiments, at least a portion of the operations may be carried out in parallel. Furthermore, in certain example embodiments, less, more, or different operations than those depicted in FIGS. 4-6 may be performed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
based on a signal occurring during execution of a first program in a first runtime environment, wherein the first program and the first runtime environment are associated with a first addressing mode:
invoking, by a processor of a computer system, a first signal exit routine associated with the first addressing mode;
allocating a signal information area (SIA) by the first signal exit routine;
calling a second signal exit routine associated with a second addressing mode that is different from the first addressing mode with an address of the SIA;
allocating a mirror SIA by the second signal exit routine;
handling the signal; and
resuming execution based on the handling of the signal;
based on initializing of the first runtime environment associated with the first addressing mode, registering the first signal exit routine with an operating system of the computer system; and
based on initializing of a second runtime environment associated with the second addressing mode, registering the second signal exit routine with the operating system,
wherein the first runtime environment comprises a secondary runtime environment, the second runtime environment comprises a parent runtime environment, and the execution of the first program corresponds to a call from the second runtime environment to the first runtime environment.

2. The method of claim 1, further comprising:
determining a location of a transition routine stack frame in a first stack of the first runtime environment by the first signal exit routine;
storing a location of a stack frame prior to the transition routine stack frame in the SIA by the first signal exit routine; and
determining a signal handler in a second stack of the second runtime environment by the second signal exit routine, wherein the signal handler handles the signal.

3. The method of claim 1, further comprising, based on the signal being handled:
collapsing stack frames in a stack from a top stack frame to a resume point, wherein execution is resumed at the resume point.

4. A system comprising:
a memory having computer readable instructions; and
one or more processors for executing the computer readable instructions, the computer readable instructions controlling the one or more processors to perform operations comprising:
based on a signal occurring during execution of a first program in a first runtime environment, wherein the first program and the first runtime environment are associated with a first addressing mode:
invoking a first signal exit routine associated with the first addressing mode;
allocating a signal information area (SIA) by the first signal exit routine;
calling a second signal exit routine associated with a second addressing mode that is different from the first addressing mode with an address of the SIA;
allocating a mirror SIA by the second signal exit routine;
handling the signal; and
resuming execution based on the handling of the signal;
based on initializing of the first runtime environment associated with the first addressing mode, registering the first signal exit routine with an operating system of the computer system; and based on initializing of a second runtime environment associated with the second addressing mode, registering the second signal exit routine with the operating system, wherein the first runtime environment comprises a secondary runtime environment, the second runtime environment comprises a parent runtime environment, and the execution of the first program corresponds to a call from the second runtime environment to the first runtime environment.

5. The system of claim 4, wherein the operations further comprise:

determining a location of a transition routine stack frame in a first stack of the first runtime environment by the first signal exit routine;

storing a location of a stack frame prior to the transition routine stack frame in the SIA by the first signal exit routine; and determining a signal handler in a second stack of the second runtime environment by the second signal exit routine, wherein the signal handler handles the signal.

6. The system of claim 4, wherein the operations further comprise, based on the signal being handled: collapsing stack frames in a stack from a top stack frame to a resume point, wherein execution is resumed at the resume point.

7. A computer program product comprising a computer readable storage medium having program instructions embodied therewith, the program instructions executable by a processor to cause the processor to perform operations comprising:

based on a signal occurring during execution of a first program in a first runtime environment, wherein the first program and the first runtime environment are associated with a first addressing mode:

invoking a first signal exit routine associated with the first addressing mode;

allocating a signal information area (SIA) by the first signal exit routine;

calling a second signal exit routine associated with a second addressing mode that is different from the first addressing mode with an address of the SIA;

allocating a mirror SIA by the second signal exit routine;

handling the signal; and resuming execution based on the handling of the signal;

based on initializing of the first runtime environment associated with the first addressing mode, registering the first signal exit routine with an operating system of the computer system; and based on initializing of a second runtime environment associated with the second addressing mode, registering the second signal exit routine with the operating system, wherein the first runtime environment comprises a secondary runtime environment, the second runtime environment comprises a parent runtime environment, and the execution of the first program corresponds to a call from the second runtime environment to the first runtime environment.

8. The computer program product of claim 7, wherein the operations further comprise:

determining a location of a transition routine stack frame in a first stack of the first runtime environment by the first signal exit routine;

storing a location of a stack frame prior to the transition routine stack frame in the SIA by the first signal exit routine; and determining a signal handler in a second stack of the second runtime environment by the second signal exit routine, wherein the signal handler handles the signal.

* * * * *